Jan. 12, 1971   H. A. SCHWARTZ   3,555,420
VOLTAGE TESTING INSTRUMENT
Filed Sept. 6, 1967
4 Sheets-Sheet 1
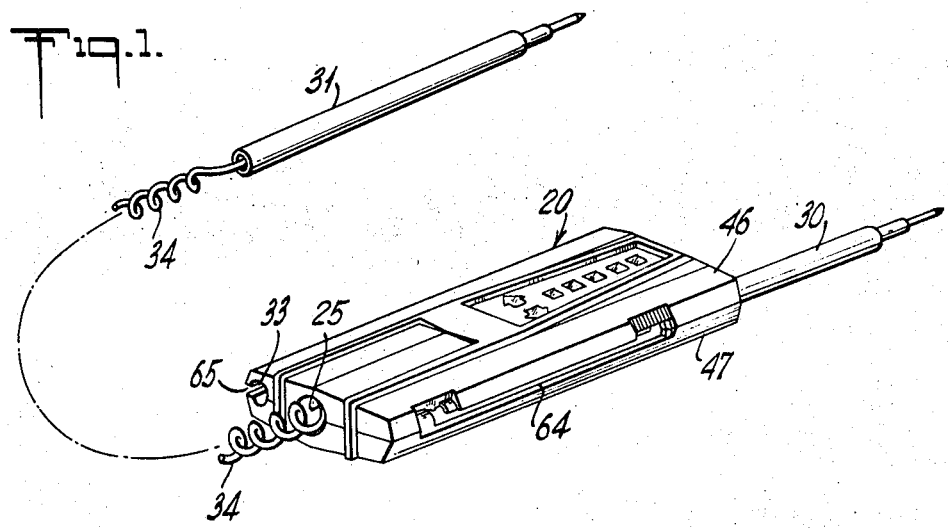
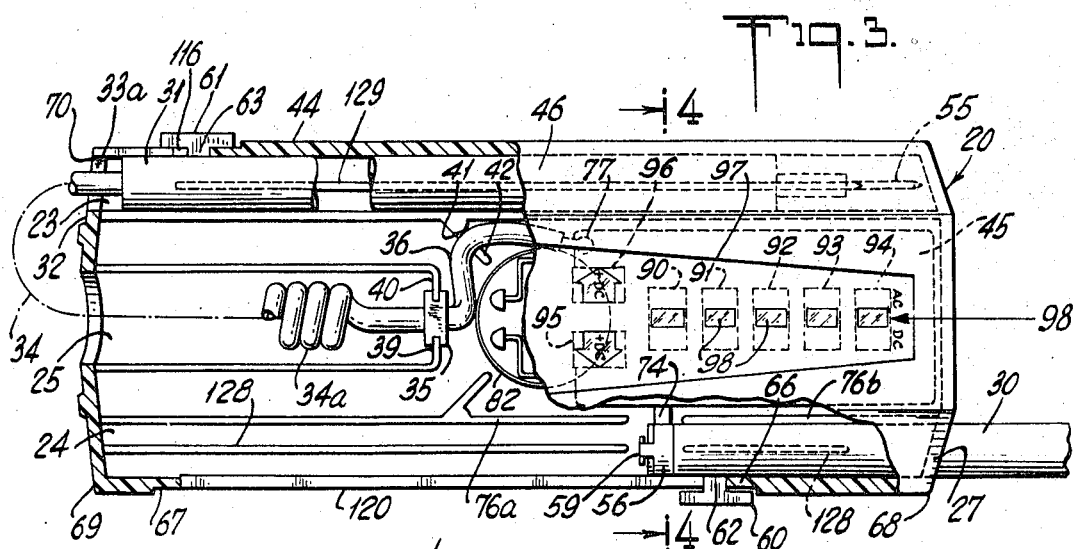
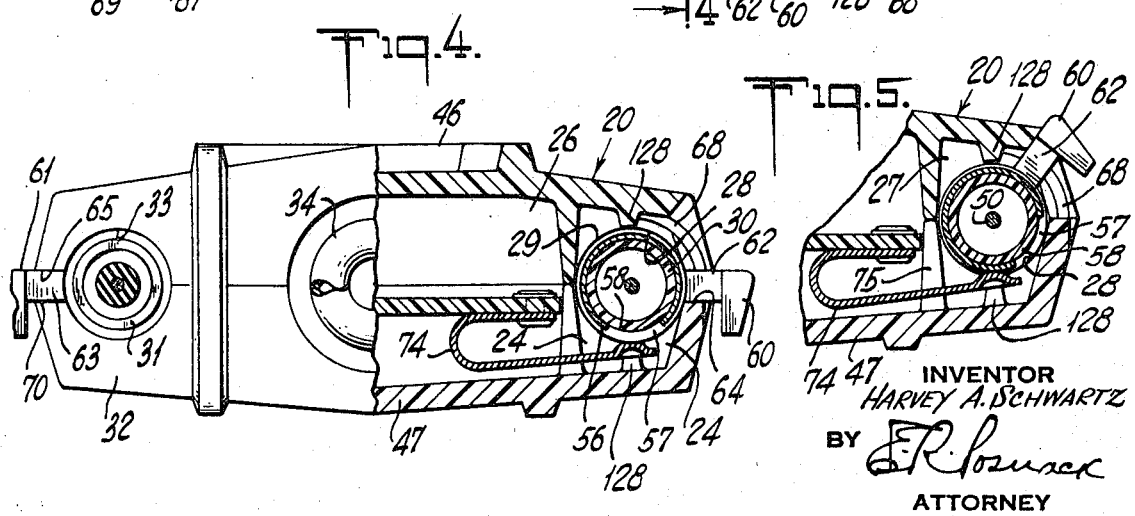
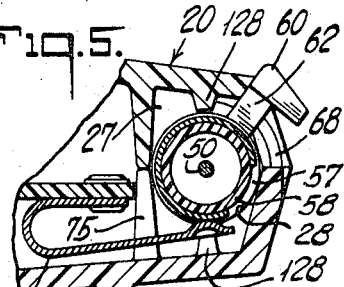
INVENTOR
HARVEY A. SCHWARTZ
BY
ATTORNEY

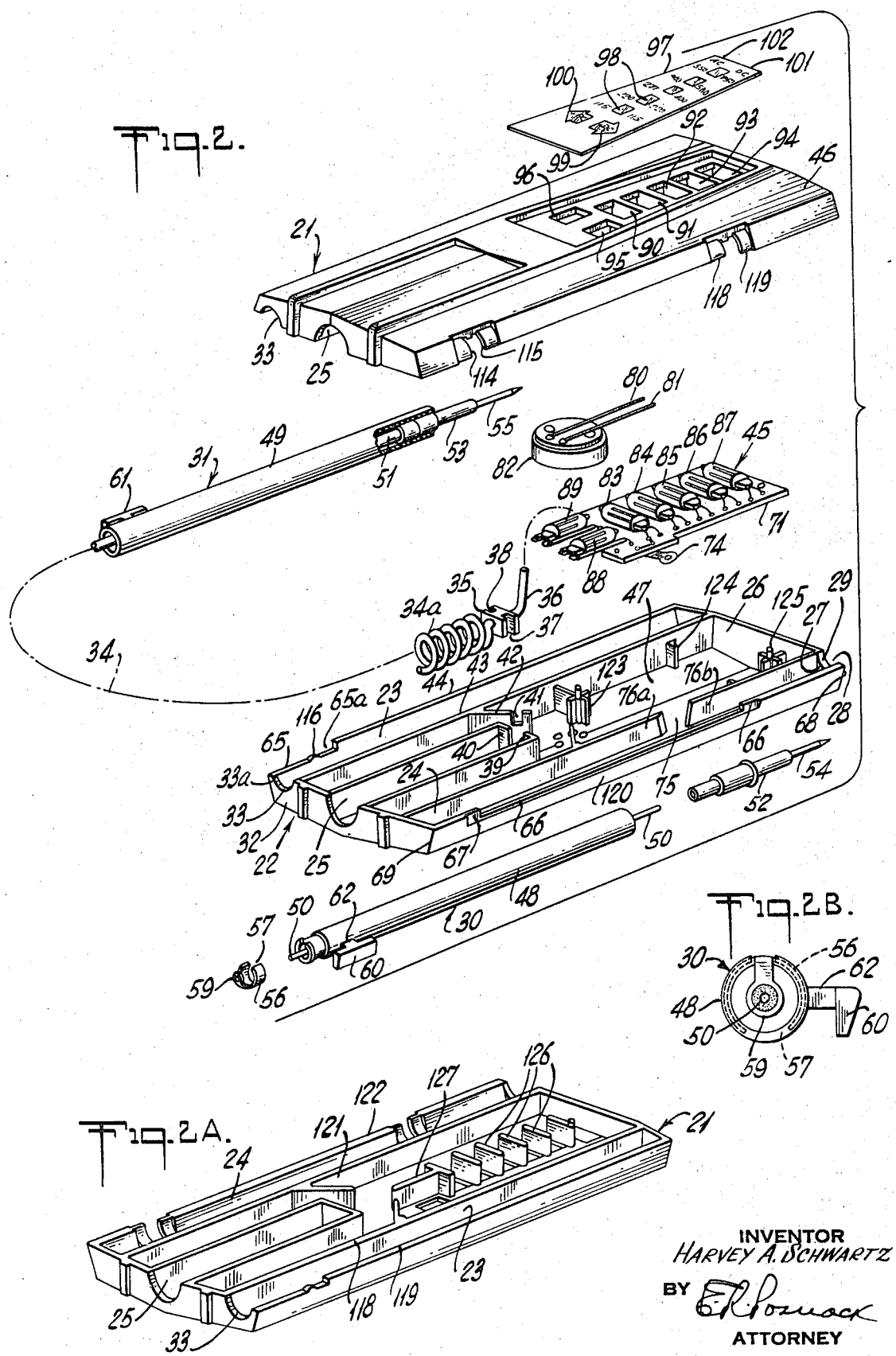

Jan. 12, 1971     H. A. SCHWARTZ     3,555,420
VOLTAGE TESTING INSTRUMENT
Filed Sept. 6, 1967     4 Sheets-Sheet 3
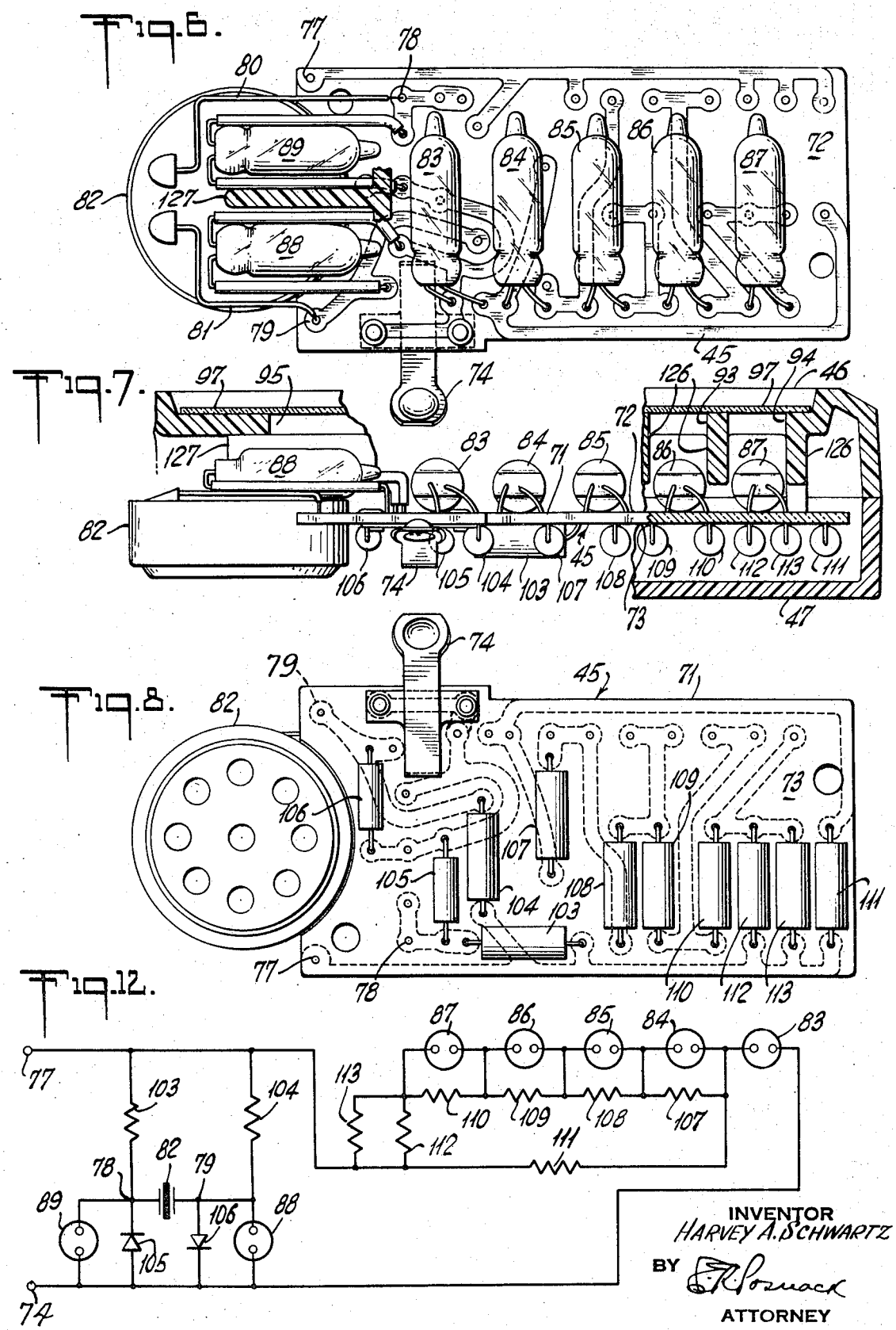
INVENTOR
HARVEY A. SCHWARTZ
BY 
ATTORNEY

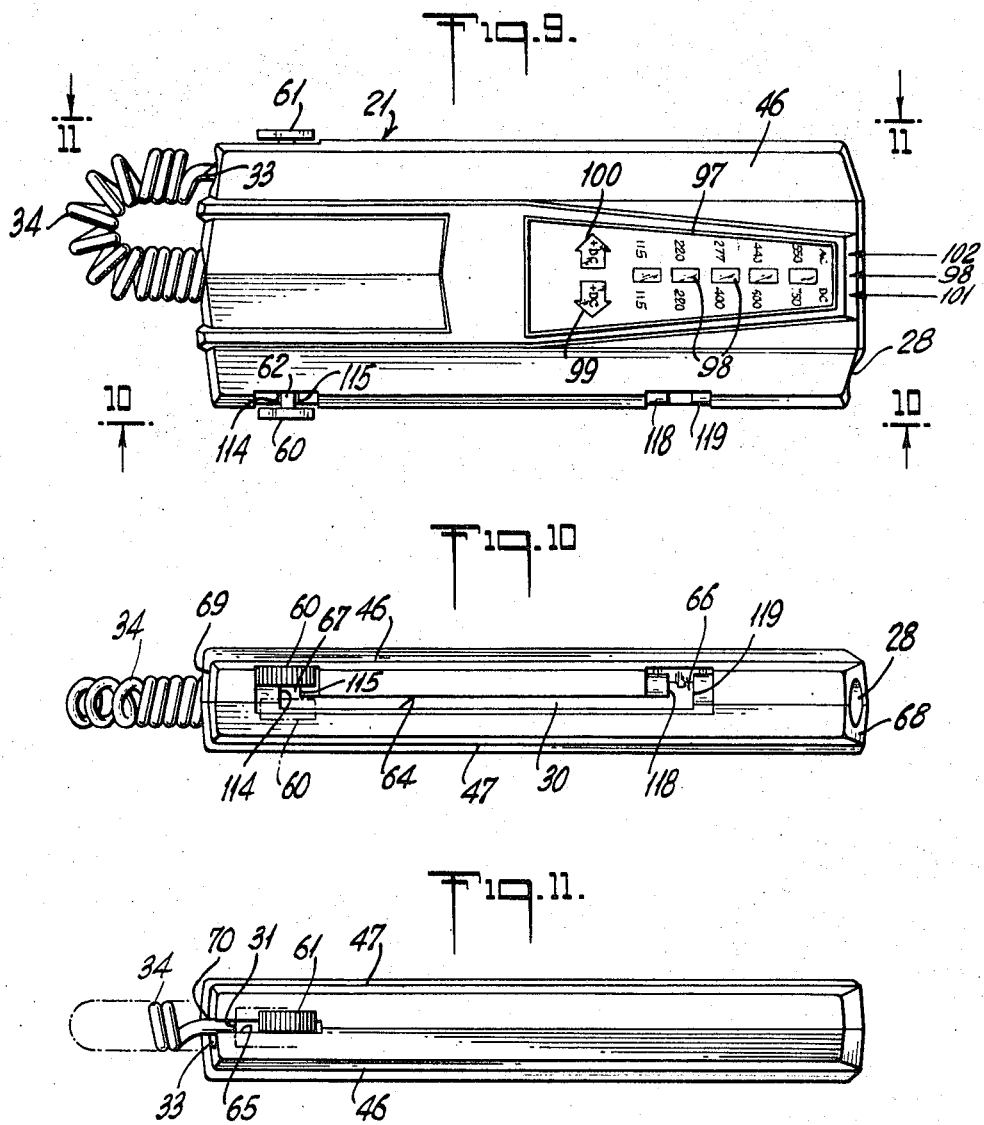

United States Patent Office 3,555,420
Patented Jan. 12, 1971

3,555,420
VOLTAGE TESTING INSTRUMENT
Harvey A. Schwartz, Merrick, N.Y., assignor to Soss Manufacturing Company, Detroit, Mich., a corporation of Nevada
Filed Sept. 6, 1967, Ser. No. 669,348
Int. Cl. G01r 1/06, 31/02
U.S. Cl. 324—149          4 Claims

ABSTRACT OF THE DISCLOSURE

A portable instrument for indicating, by both visual and audible means, the voltage level of a circuit, the type of circuit tested (whether AC or DC), if DC, the polarity, and if AC, the frequency. A casing supports two probes, a portion of a coiled extensible conductor that is connected to one of said probes which is removable from the casing, the other probe being at all times connected to the casing, a panel with electrical components connected to said probes and including a series of neon lamps arranged in a circuit to fire at successively higher voltage levels, a scale with AC and DC readings adjacent said lamps, polarity indicating lamps, and a piezo-electric transducer for generating an audible tone in response to an applied AC voltage. The length of the column of light produced by the operatively lighted lamps indicates the voltage level, other lamps indicating whether the circuit is AC or DC, and the polarity if DC, the piezo-electric member indicating by its actuation that the circuit is AC, and by its pitch the frequency of the circuit.

BACKGROUND OF THE INVENTION

The field of the invention

This invention relates to portable electrical instruments for indicating, by visual and audible means, the voltage level of a circuit, the type of the circuit (whether AC or DC), its polarity if DC, and its frequency if AC.

The known art

There are various types of voltage testers, primarily the solenoid type indicator employing the effect of electromagnetic induction working against spring means, and the neon type indicator. Though both give voltage readings, they require visual inspection in order to determine whether the circuit is AC or DC; and neither type enables a ready determination to be made of the frequency of the circuit. Many of these instruments are not conveniently adapted for taking readings in regions not readily within sight, so that even if provided with frequency indicators readings cannot always be taken.

Solenoid type voltage testers have the further disadvantage of overheating or burning out if left on certain circuits for long periods of time. Moreover, using magnetic components, they are generally operable only at specific frequencies, becoming utterly unreliable at frequencies deviating more than 10% from the standard calibrated frequency. Therefore they are unsuited for such applications as ground support equipment for aircraft where voltage measurements must be made at 60 cycles and 400 cycles.

OBJECTIVES OF THE INVENTION

The present invention has for its objective the provision of a device having none of the disadvantages above mentioned, yet adapted, by means contained in one compact unit, to give, among others, voltage level and polarity readings by visual means and frequency indications by audible means.

It is also an object of my invention to provide a voltage tester that can be employed for visual indications in a wide range of frequencies, such as from 50 to 400 cycles, without any significant change in sensitivity.

In connection with the above-mentioned audible aspect of my invention, it is an object to provide a piezo-electric transducer as a component of the unit that will create readily distinguishable sound signals of commonly encountered frequencies.

Another object of this invention is the provision of means for protecting said transducer over a wide range of input voltages, as well as providing a device that may be left on a circuit over extended periods without the danger of damage.

And it is within the contemplation of this invention to embody the above-mentioned features in a relatively simple and compact unit that can conveniently be held in the hand, in which the probe members are completely contained within the casing when not in use but which can be readily and positively moved and placed into operative positions by simple manual manipulations, and wherein the device is in electrically operative condition only when the device is ready for use.

Other objects, features and advantages will appear from the drawings and the description hereinafter given.

SUMMARY OF THE INVENTION

The preferred embodiment of my invention comprises a casing supporting two retractable probes, these being concealed within the casing when in their retracted positions, but manually movable outwardly into operative positions. A coiled extensible conductor is partly concealed within the casing, the inner end being electrically connected to an inner terminal of a circuitry panel, the outer end being attached to one of said probes which, when in its operative position, is entirely separated from the casing. The other probe is slidably movable to an operative position at which it is attached to but extending outwardly from the casing, this probe being rotatable to a locked position at which it brings a contact element into engagement with a fixed internal contact, whereby the device is readied for testing.

Contained within the casing is a panel with electrically connected components including a series of neon lamps arranged in a circuit to fire at successively higher voltage levels, a scale with AC and DC readings adjacent said lamps, and a piezo-electric transducer for generating an audible tone in response to the applied voltage, the pitch of the tone indicating the frequency of the voltage under test. The circuit arrangement permits a visual indication of the voltage level by a rising column of light—the higher the column the higher the voltage being impressed on the probe terminals of the device. The components are so selected that the lamps will ignite at common voltages, so that the visible column of light could identify, for example, 115, 220, 277, 440 and 550 volts in an AC circuit, or 115, 220, 350, 500 and 750 volts in a DC circuit.

Polarity in a DC circuit is identified by employing two diodes and two neon type lamps, these being so arranged in the circuit on the panel that only the lamp operatively connected to the positive side of the circuit will glow.

The said piezo-electric transducer, being capable of activation only when an AC signal is present, produces an audible sound only in such a circuit, the absence of a sound indicating that the circuit under test is DC. Since the pitch of the tone is dependent upon the frequency of vibration of the transducer, the operator, with a little practice, will readily be able to identify the frequency of various voltages, such as frequencies of 25, 50, 60, 400 and 800 cycles per second.

In carrying out the above-stated objective of protecting the piezo-electric element over a wide range of input voltages, the element is electrically connected in an electrical network, to be hereinbelow described, so as to have its maximum voltage excursion clamped by the firing potential of one or the other of two neon bulbs, irrespective of the level of input voltage.

DESCRIPTION OF THE DRAWINGS

FIG. 1 is a perspective view of a preferred embodiment of the voltage testing instrument of this invention, the two probe members being shown in their operative positions.

FIG. 2 is an exploded perspective view of the main components of this invention, portions being removed for clarity.

FIG. 2A is a perspective view of the upper shell of this invention, showing the interior thereof.

FIG. 2B is an end view of the probe member shown at the bottom of FIG. 2.

FIG. 3 is a fragmentary top view of said instrument, parts being removed and sectioned for clarity, the captive probe member being shown in its projected position and the other probe member being shown in its retracted position within the casing.

FIG. 4 is an enlarged part rear elevational view and part sectional view of FIG. 3, the section being taken along line 4—4, the captive probe member being shown in an electrically disconnected position.

FIG. 5 is a fragmentary sectional view of the section shown in FIG. 4, but showing the captive probe member in an operative electrically connected position.

FIG. 6 is a plan view of the circuitry panel and piezo-electric member and the associated parts as used in this invention.

FIG. 7 is a part side elevation and part section of the panel of FIG. 6, the piezo-electric member and electrical components being shown in elevation, a fragmentary forward portion of the casing being shown in longitudinal section.

FIG. 8 is a bottom view of FIG. 6.

FIG. 9 is a top view of said instrument shown with the probe members in their respective retracted positions.

FIG. 10 is a side view of FIG. 9 looking in the direction of arrows 10—10, the dot-dash lines showing the knob in its position in line with the slide slot.

FIG. 11 is a side view of FIG. 10 looking in the direction of arrows 11—11.

FIG. 12 is a schematic circuit diagram of the embodiment of this invention illustrated in the previous figures.

DESCRIPTION OF PREFERRED EMBODIMENT

In the particular embodiment of my invention illustrated, the casing 20 comprises the top shell 21 and the bottom shell 22, the interior portions of said shells having coacting walls that form the probe compartments 23 and 24 at laterally opposite sides of the casing, an intermediate conductor housing 25 at the rear of the casing and forwardly of said housing a cavity 26 with supports for a circuitry panel to be hereinbelow described.

At the front end of said compartment 24 is the wall 27 containing therein the circular aperture 28 defined by the annular wall 29, said aperture being proportioned to permit the operative movement therethrough of the probe 30 which is slidably and rotatably supported within said compartment 24, said annular wall 29 serving as bearing and supporting means for said probe 30, all as will more clearly hereinafter appear. The said compartment 23 is proportioned to accommodate the other probe 31, the rear wall 32 of compartment 23 containing therein the circular aperture 33 defined by the annular wall 33a, said latter aperture being proportioned to permit the operative removal therethrough of said probe 31, said latter probe being positioned and slidably supported within said compartment 23.

Extending rearwardly from the back of said probe 31 is the resilient extensible coiled conductor 34 normally yieldably maintained in its contracted condition in a manner well-known to those skilled in the art. The rear portion of said coiled conductor is attached to the laterally grooved strain reliever block 35, the conductor lead 36, electrically connected to said conductor 34, being anchored to said block 35 and extending forwardly therefrom. The rear portion 34a of conductor 34 is positioned within the said housing 25, said block 35 being secured to the front portion of said housing, such securement being effected, in the particular embodiment illustrated, by the interengagement of the lateral grooved portions 37 and 38 with the respective spaced walls 39 and 40 defining the front of said housing 25. The said conductor lead 36 extends angularly towards the said cavity 26, passing through the slotted portion 41 of the wall 42 which extends obliquely forwardly and inwardly from the inner partition wall 43 which together with the outer wall 44 forms the lower portion of said probe compartment 23. The forward end of said conductor lead 36 is electrically connected to the circuitry of the panel 45 which is operatively positioned in said cavity 26 in between the upper wall 46 of the casing 20 and the bottom wall 47, all in a manner to be more specifically hereinafter described.

The respective bodies 48 and 49 of said probes 30 and 31 are made of electrical insulating material, are hollow and of cylindrical configuration, and contain therein the respective conductors 50 and 51. The said probes are provided at the forward ends with the respective tips 52 and 53, said tips having the respective probe points or terminals 54 and 55 electrically connected to the said conductors 50 and 51, respectively, said conductor 51 being electrically connected to the said coiled conductor 34. The rear of said probe 30 has mounted thereover the contact band 56 with the gap 57 between the ends thereof, the insulated portion 58 being exposed at the region of the gap whereby, as will hereinafter appear, the operative closing and opening of the probe circuit can be effected by manually manipulating the probe. Extending from the band 56 is the prong 59 to which the rear end of the conductor 50 is electrically connected by soldering or other suitable means.

Extending radially outwardly from the rear portions of the said probes 30 and 31 are the finger knobs 60 and 61, respectively, said knobs having the respective relatively narrow connecting necks 62 and 63 joined to the said probe body portions 48 and 49, respectively. Said knobs are so proportioned and positioned that their respective necks 62 and 63 extend through the respective longitudinal slots 64 and 65 at the laterally opposite sides of the casing, said knobs being disposed exteriorly of the casing to enable them to be manually grasped. The said slots 64 and 65 are formed intermediate the said walls 46 and 47 at the regions of the junctures of the lateral sides of said top and bottom shells 21 and 22, opposing recessed portions of said lateral sides defining said slots. In the embodiment illustrated, the slotted portion 64 has its front and rear terminal portions 66 and 67 spaced from the respective front and rear ends 68 and 69 of the casing; and the slotted portion 64, of relatively short length, is disposed near the rear of the casing, the rearmost end 70 of said latter slotted portion being open. Both slotted portions are of sufficient width to permit said necks 62 and 63 to move therealong upon the operative longitudinal movement of the said probes 30 and 31 by the manual manipulation of said knobs 60 and 61. The said terminal portions 66 and 67 of slot 64 are of enlarged proportions, so as to accommodate said neck 62 of knob 60 when the probe 30 is operatively rotated about its longitudinal axis, by manipulating knob 60, for bringing said latter probe to its circuit closing and opening positions, in a manner to be hereinafter set forth.

The said circuitry panel 45 comprises a wall 71 of insulating material, a plurality of neon lamps on said wall's surface 72 facing the said upper wall 46 of the casing, and a plurality of electrical components on the opposite surface 73 of said wall 71 electrically connected to said lamps. The said panel 45 also supports a plurality of contact terminals, to wit, the contact prong 74 extending through the passageway 75 between the longitudinally aligned walls 76a and 76b which form one side of compartment 24 and into pressing engagement with the annular surface of said probe 30 positioned in said compartment, the terminal 77 electrically connected to the said conductor lead 36, and the terminals 78 and 79 connected to the respective leads 80 and 81 of the piezoelectric element 82 to be hereinafter referred to.

In the particular embodiment illustrated there is a longitudinal row of five neon lamps 83, 84, 85, 86 and 87 disposed in parallel directions transverse to the longitudinal extent of the casing, and behind the rearmost 83 of said lamps there are two other parallel neon lamps 88 and 89 disposed in directions parallel to the longitudinal extent of the casing. In substantial registry with said lamps 83 to 87 inclusive are the respective window apertures 90, 91, 92, 93 and 94 of said upper wall 46, and in substantial registry with said lamps 88 and 89 are the respective window apertures 95 and 96 of said face wall. Secured to said upper wall 46 over the region of said window apertures is the indication plate 97 containing the medial longitudinally extending row of light-transmitting areas 98 overlying the said five window apertures 90 to 94 inclusive, and the laterally opposite light-transmitting areas 99 and 100, shown in the form of arrows, overlying said window apertures 95 and 96, respectively. At opposite sides of said areas 98 are the scale indications in the respective rows 101 and 102, row 101 indicating DC voltages and row 102 AC voltages, the positions of the various indications corresponding to the positions of the window apertures 90 to 94, inclusive, in ascending order forwardly from the position of window aperture 90. Each of the said light-transmitting areas 99 and 100 contains the indication "+DC."

The said neon lamps 83 to 87 inclusive are arranged to fire, in ascending order, upon the operative application of predetermined progressively higher voltages. The arrangement is such that for a predetermined low voltage operatively applied to the instrument only lamp 83 will glow, and for predetermined higher voltages lamp 83 together with other lamps in progressive order will glow, thereby producing a visible column of light areas 98 of the scale plate 97, longer columns being produced by higher voltages. As in the case of a thermometer, the markings on the scales of rows 101 and 102 indicate the applied voltage, the voltage indication adjacent the top of the column of light being the desired reading.

As will appear from the description hereinafter given of the circuit shown, by way of example, in FIG. 12, a fairly constant voltage is developed across the ignited lamps and serves as a back bias for unlit lamps, thereby enabling the generation of the variable column of light above mentioned. The circuit is such that when both lamps 88 and 89 are lit, as seen through the light-transmitting arrows 99 and 100 on the scale plate 97, the tested circuit is AC. When the circuit is DC, only one of said arrows will be lit, indicating the polarity of the tested terminals, that is, indicating which is the positive terminal of the circuit being tested by the operative use of the probes 30 and 31 in the manner heerinbelow described.

An important feature of the invention is the use of the said piezo-electric element 82 as a transducer for giving an audible indication not only of the nature of the voltage being tested—whether AC or DC—but also the frequency of the voltage when it is AC. Since a piezo-electric element is activated only by an AC signal, the tone of said element 82 will indicate the presence of an AC voltage, and the absence of a sound will indicate that the voltage being tested is DC. And inasmuch as the rate of vibration of a piezo-electric element varies with the frequency of the applied voltage, the action in the instrument of this invention is such that the higher the frequency of the voltage the higher the pitch of the sound of the said piezoelectric element 82. Since the instrument is employed for use with voltages having a relatively few distinctively different frequences, the operator of the instrument can, with a little practice, readily learn to identify such common frequencies as 25, 50, 60, 400 and 800 cycles per second.

It is noteworthy that the said piezo-electric element 82 is protected over a wide range of input voltages. This is accomplished by an electrical network having electrical components of suitable characteristics, the particular circuit illustrated showing a network comprising the resistors 103 and 104, the diodes 105 and 106 and the said neon lamps 88 and 89. The piezo-electric element 82 is electrically connected so as to have its maximum excursion clamped by the firing potential of one or the other of said lamps 88 and 89—which, in the particular circuit illustrated, is approximately 60–70 volts AC—irrespective of the level of the input voltage. Where the alternate neon bulbs are not firing, one or the other side of the said piezo-electric element is clamped to ground by one of the diodes 105 and 106.

The said piezo-electric element 82 is mounted within the casing 20 rearwardly of said circuitry panel 45. On the undersurface 73 of said panel 45 are mounted the said resistors 103 and 104, the said diodes 105 and 106, the resistors 107, 108, 109, 110 arranged in parallel with respect to the said respective neon lamps 84, 85, 86 and 87, the resistors 111, 112 and 113, and the interconnecting circuitry to be hereinafter described. The positioning of said panel 45 in spaced parallel relation to the upper wall 46 and the opposite wall 47, is such as to leave adequate room for the neon tubes on the surface 72 and the electrical elements on surface 73 of said panel.

The device in its inoperative position, as illustrated in FIGS. 9, 10 and 11, contains therein both probes 30 and and 31, these being completely confined within the said respective compartments 24 and 23. The probes are maintained locked against movement from their respective retracted positions until manually manipulated—the neck 62 associated with said knob 60 of probe 30 being positioned within said terminal slot 67 between stops 114 and 115, the said neck 63 associated with knob 61 of probe 31 being positioned in the terminal portion 65a of slot 65—forwardly of stop bump 116 (FIGS. 2, 3). The coiled extensible conductor 34 has its rear portion 34a disposed within the said housing 25, the exterior portion of said coiled conductor assuming a substantial U-shape in view of its extension from the rear of probe 31. Since said coiled resilient conductor 34 normally assumes a contracted position, as aforesaid, the said exterior portion thereof occupies a minimum of space at the rear of the casing 20, and does not in any way interfere with the handling of the unit.

To move probe 30 into its operative position, the finger knob 60 is moved downwardly to bring the neck 62 out of engagement with stops 114 and 115 and in line with the side slot 64—the said downward manipulation of knob 60 causing a rotation of the probe 30 around its longitudinal axis. The knob is then moved forwardly along said slot 64 until the neck 62 engages the wall 117 of said latter slot, whereafter the knob is moved upwardly into the enlarged terminal portion 66, the neck now being positioned between stops 118 and 119. The said forward movement of the probe 30 projects it out through the said front aperture 28 into its operative position shown in FIGS. 1 and 3, the said annular wall 29 serving as a bearing for the probe 30 during both its longitudinal and rotational operative movements. In this position the probe is locked and ready for use, the said contact band 56 being in engagement with the said prong contact 74 extending laterally from the panel 45. It is to be noted that before the probe 30 is rotated into its locked position, the said exposed portion 58 of the probe 30, made as aforesaid of insulating material, is in engagement with said prong contact 74; and when the said probe 30 is in its retracted position the said contact band 56 is spaced rearwardly from said prong contact 74. Hence, only when the probe 30 is in its operative locked position as shown in FIG. 5 it is electrically connected to the circuitry panel 45 and associated parts.

For operative use, the said probe 31 must be entirely removed from its compartment 23. This is accomplished by grasping the said finger knob 61 and pulling it rearwardly along the slot 65, whereby the neck 63 will ride over the said bump 116, permitting the entire probe to be readily withdrawn from the casing through the open end 70 of the latter slot. Now both probes 30 and 31 are in operative position, so that the probe terminals 54 and 55 can readily be applied to the two line terminals of the circuit to be tested.

The extensible nature of the conductor 34 gives considerable flexibility in the use of this instrument in reaching two line terminals that are spaced various distances from one another. The secure positioning of the probe 30—sometimes referred to as the "captive" probe—enables a firm contact of the probe point 51 with a line terminal to be made by the hand grasping the casing 20. The arrangement is hence such that an operator can test circuits while holding the casing 20 for convenient reading. The column of light in the slit 98 in the scale plate 97 clearly indicates the nominal voltage of the circuit. If there is a tone from the piezo-electric element, he immediately knows that the circuit being tested is AC—an indication which can be verified by the lighting of both arrows 99 and 100. As aforesaid, the pitch of the audible sound of the piezo-electric transducer will indicate the frequency of the AC voltage being tested. The absence of a sound from the piezo-electric transducer 82 indicates that the voltage being tested is DC. In that event, only one of the arrows 99 and 100 will be lit, that arrow indicating the probe which has been placed upon the positive terminal of the circuit being tested. Accordingly, this device also conveniently serves as a polarity indicator.

In the particular circuit illustrated in FIG. 12, each of the neon lamps 83–87 has approximately the same value of firing voltage or breakdown voltage. However, the special circuit arrangement illustrated causes them to fire at different levels of voltage as applied to terminals 77 and 74. Initially, none of the neon lamps 83–87 is conductive and the full amount of the applied voltage appears across the lower neon lamp 83. When it exceeds the breakdown value, lamp 83 becomes conductive, thus producing the visible glow of light. Because of the voltage regulating action of the gaseous discharge in lamp 83, the circuit junction at the upper terminal of lamp 83 is clamped at a voltage level equal to the lamp maintenance voltage. This biases the lower terminal of the next lamp, lamp 84, at this voltage level. Consequently, such lamp 84 will not fire until the voltage applied to terminals 77 and 74 exceeds a value which is determined by the maintenance voltage of lamp 83, the breakdown voltage of lamp 84, and the characteristics of the resistor network 107 to 113. In a similar manner after lamp 84 fires it will bias the lower end of lamp 85 to a voltage level consisting of the maintenance voltages of lamp 83 plus lamp 84. By judicious selection of lamp firing and maintenance voltages and resistor network values, the neon lamps 83–87 are caused to commence conduction at successively higher levels of input voltage applied across the terminals 77 and 74.

The scale values for AC and DC voltages marked on the scale plate 97 are somewhat different for the higher voltage levels. This is because neon lamps are primarily responsive to the peak amplitudes of AC voltages, i.e., a neon lamp will fire when the peak value of the AC across it exceeds its breakdown voltage. If, therefore, it is desired to calibrate the AC voltage scale in terms of the more conventional R.M.S. values, then it is necessary to convert the peak values to such R.M.S. values.

In connection with the operation of the piezo-electric sound-producing device 82, a DC voltage has, of course, a frequency of zero and hence no audible tone is produced in such case. For AC voltages, on the other hand, an audible tone is produced and its pitch is proportional to the frequency of such AC voltage.

If the voltage applied to terminals 77 and 74 is a DC voltage in excess of the neon lamp breakdown voltage and if the voltage on terminal 77 is positive with respect to that on terminal 74, then current will flow through the resistor 103 and the neon lamp 89. Diode 105 is non-conductive in this case since it is back-biased. At the same time, current will also flow through resistor 104 and diode 106, the latter being forward-biased at this time. Neon lamp 88 will not conduct current because of the short-circuiting action provided by the conductive diode 106. In other words, the voltage drop across diode 106, and hence neon lamp 88, is negligible at this time.

If, on the other hand, the applied voltage is DC, but the voltage at the terminal 77 is negative with respect to that at terminal 74, then current will flow through resistor 104 and the second neon lamp 88, the second diode 106 this time being back-biased. Current will also flow through the first resistor 103 and the first diode 105 which is now forward-biased, but will not flow through the first neon lamp 89 because of the short-circuiting action of the diode 105.

As thus seen, if a positive DC voltage is applied to terminal 77, then neon lamp 89 is lit and lamp 88 is unlit. Conversely, if a negative DC voltage is applied to terminal 77, the second lamp 88 is lit and the first lamp 89 is unlit. This provides a visual indication of the polarity of applied DC voltages. If the applied voltage is AC, then both of the lamps 88 and 89 will be lit, lighting of the lamp 89 being provided by the positive half cycles and lighting of the lamp 88 being provided by the negative half cycles.

Not only do the neon lamps 88 and 89 provide polarity indications, but in addition they also provide a voltage regulating action for the piezo-electric transducer 82 for preventing the voltage across such transducer from exceeding a predetermined value and thereby preventing damage to such transducer 82. This is because, at any given instant, one side of the transducer 82 will be shorted to the terminal 79 by a conductive diode, while the other side will be connected to the terminal 74 by a conductive neon lamp. Since the conductive diode will have a negligible voltage drop thereacross and since the conductive neon lamp will have a voltage drop thereacross which is limited to the breakdown voltage of such lamp, the net voltage across the transducer element 82 cannot exceed a value equal to the breakdown voltage of a single neon lamp. Thus, the piezo-electric transducer is protected from the harmful effect of excessively high voltages.

It is thus apparent that the unit above described can conveniently and safely perform a number of important indicating functions, and yet is extremely compact both in its operative and inoperative positions. The compactness is due to the special arrangement of the casing components. The walls 43 and 44 in cooperation with walls 118 and 119 of the upper shell 21 form the said compartment 23 for probe 31; and the walls 76a, 76b and lateral wall 120 of the lower shell 22 in cooperation with the corresponding upper walls 121 and 122 form the said compartment 24 for the probe 30. The wall 71 of panel 45 rests upon the props 123, 124 and 125 of the bottom shell 22. In the particular embodiment illustrated, a plurality of spaced partitions 126 extend down into the repsective spaces between adjacent neon tubes 83 to 87, as indicated in FIG. 7, there also being a partition 127 (FIG. 2A) which is positioned between the neon tubes 88 and 89. These partitions serve both as retainer means to prevent displacement of said neon tubes beyond their intended locales and as light barriers to limit the light from said respective tubes substantially to their respective areas, thereby to clearly define the lit areas. There are also upper and lower narrow longitudinal rails 128 in compartment 24 with which the probe member 30 is in slidable and rotatable engagement, and similar rails 129 in compartment 23 with which the probe member 31 is in slidable engagement, thereby to facilitate the operative movement of said probe members within their respective compartments.

In the above description the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. In an electrical measuring instrument for testing voltage, a casing, a first and a second probe each having a contact tip for engaging a terminal of a circuit to be tested, said probes being proportioned for positioning within said casing and being movable from respective inner inoperative positions to outer operative positions, a flexible conductor having an outer end attached to said first probe and electrically connected to its said contact tip and an inner end disposed within said casing, voltage indicating means within said casing, said inner end of said conductor being electrically connected to said voltage indicating means, and contact means on said second probe electrically connected to the latter's contact tip, said contact means comprising a contact band disposed on the inside portion of said second probe, said voltage indicating means having a contact element extending into the operative path of said second probe, said contact band and contact element being so proportioned and positioned that they are in operative engagement only when said second probe is in its said outer operative position.

2. In an electrical measuring instrument, the combination according to claim 1, said second probe being rotatable about its longitudinal axis between two limiting positions, said contact band partially embracing the body of said second probe thereby exposing the portion of said body between the ends of said band, said exposed portion being of electrical insulating material, said contact band and contact element being so proportioned and positioned that said contact element is engageable with said contact band when said second probe is in one of its said limiting positions and is engageable with said insulated portion of said probe when the latter is in the other of its said limiting positions.

3. In an electrical measuring instrument for testing voltage, a casing, a first and a second probe each having a contact tip for engaging a terminal of a circuit to be tested, said probes being proportioned for positioning within said casing and being movable from respective inner inoperative positions to outer operative positions a resilient extensible coiled conductor normally yieldably maintained in contracted condition, a portion of said conductor being positioned and concealed within said casing in adjacent relation to said first probe when in its said inoperative position within the casing, the rest of said coiled conductor extending outwardly from the casing and being attached to said latter probe and electrically connected to its said contact tip, whereby the external portion of said coiled conductor is of contracted substantially U-shaped configuration when said first probe is in its said inoperative position, a circuitry panel within said casing, voltage indicating means on said panel, the inner end of said concealed portion of said coiled conductor being electrically connected to said voltage indicating means, and contact means on said second probe electrically connected to the latter's said contact tip and positioned for electrical connection with said voltage indicating means, said casing having laterally opposite compartments proportioned for slidably accommodating therein said respective probes, the rear end of said first probe's compartment having an apertured portion therein proportioned to permit the slidable withdrawal of said first probe from said compartment, the front end of said second probe's compartment having an apertured portion therein proportioned to permit the slidable outward movement of said second probe into a predetermined outer operative position, and means to hold said second probe when in its said operative position in engagement with said casing, the lateral side of the casing adjacent said second probe's compartment having a longitudinal slotted portion intermediate the opposite ends of the casing, the opposite terminal portions of said slotted portion being spaced from the respective front and rear ends of the casing, the lateral side of the casing adjacent said first probe's compartment having a longitudinal slotted portion open at the rear end of the casing and extending forwardly to a forward terminal portion, and knob means attached to said respective probes and extending out through said respective slotted portions, whereby said probes may manually be operatively slidably moved in the directions of said respective slotted portions between their respective operative and inoperative positions, said contact means on said second probe comprising a contact band disposed on the rear of said latter probe, said circuitry panel having a contact prong electrically connected to said voltage indicating means and extending into the said second probe's compartment, said contact band and contact prong being so proportioned and positioned that they are in operative engagement only when said second probe is in its foremost operative position.

4. In an electrical measuring instrument, the combination according to claim 3, said second probe being rotatable about its longitudinal axis between the two limiting positions, at least the forward terminal of the slotted portion of the second probe's compartment being of enlarged proportions for accommodating the second probe's said knob means upon the operative rotation of said latter probe between its said limiting positions when in its foremost operative position, said contact band partially embracing the body of said latter probe thereby exposing the portion of said body between the ends of said band, said exposed portion being of electrical insulating material, said contact prong extending into the operative path of said second probe, said contact band and contact prong being so proportioned and positioned that said prong is engageable with said contact band when said probe is in one of its said limiting positions and is engageable with said insulated portion of said probe when the latter is in the other of its said limiting positions.

References Cited

UNITED STATES PATENTS

| 1,495,429 | 5/1924 | Nicolson | 179—110 |
| 2,094,645 | 10/1937 | Foulke | 324—72.5X |
| 2,580,416 | 1/1952 | Ericson | 324—72.5X |
| 2,586,203 | 2/1952 | Boyle | 324—149X |
| 2,993,167 | 7/1961 | Smith | 324—72.5X |
| 3,281,692 | 10/1966 | Beroset | 324—133X |

OTHER REFERENCES

Bretemps et al.: "A Transistor Frequency Meter," Electronic Industries, October 1960, pp. 196–197.

RUDOLPH V. ROLINEC, Primary Examiner

E. F. KARLSEN, Assistant Examiner

U.S. Cl. X.R.

324—72.5